US011249906B2

(12) United States Patent
Ramini et al.

(10) Patent No.: US 11,249,906 B2
(45) Date of Patent: Feb. 15, 2022

(54) JUST-IN-TIME DATA PROVISION BASED ON PREDICTED CACHE POLICIES

(71) Applicant: Baker Hughes, a GE Company, LLC, Houston, TX (US)

(72) Inventors: Purna Ramini, Tracy, CA (US); Raghu Edalur, San Ramon, CA (US)

(73) Assignee: Baker Hughes, a GE Company, LLC, Houston, TX (US)

( * ) Notice: Subject to any disclaimer, the term of this patent is extended or adjusted under 35 U.S.C. 154(b) by 0 days.

(21) Appl. No.: 16/844,118

(22) Filed: Apr. 9, 2020

(65) Prior Publication Data

US 2020/0233800 A1    Jul. 23, 2020

Related U.S. Application Data

(63) Continuation of application No. 16/238,259, filed on Jan. 2, 2019, now Pat. No. 10,705,955.

(51) Int. Cl.
| | | |
|---|---|---|
| *G06F 12/0802* | (2016.01) | |
| *G06N 20/00* | (2019.01) | |
| *G06F 12/0862* | (2016.01) | |
| *G06F 12/128* | (2016.01) | |
| *G06N 20/10* | (2019.01) | |
| *G06N 7/00* | (2006.01) | |
| *G06N 7/02* | (2006.01) | |
| *G06N 3/12* | (2006.01) | |
| *G06N 3/08* | (2006.01) | |
| *G06N 5/00* | (2006.01) | |
| *G06N 20/20* | (2019.01) | |

(52) U.S. Cl.
CPC ......... *G06F 12/0802* (2013.01); *G06N 20/00* (2019.01); *G06F 2212/6046* (2013.01)

(58) Field of Classification Search
None
See application file for complete search history.

(56) References Cited

U.S. PATENT DOCUMENTS

| | | |
|---|---|---|
| 2011/0264663 A1 | 10/2011 | Verkasalo |
| 2015/0313529 A1 | 11/2015 | Nevo et al. |
| 2016/0010445 A1 | 1/2016 | Harrison et al. |
| 2016/0306895 A1 | 10/2016 | Kaewell et al. |
| 2017/0006135 A1 | 1/2017 | Siebel et al. |
| 2019/0253520 A1* | 8/2019 | Maharana ................ G06N 3/08 |

\* cited by examiner

*Primary Examiner* — Michael Alsip
(74) *Attorney, Agent, or Firm* — Mintz Levin Cohn Ferris Glovsky and Popeo, PC; Lisa Adams

(57) ABSTRACT

Systems, and methods are provided for predicting a cache policy based on application input data. Inputs provided to an application and corresponding to a usage pattern of the application can be received. The inputs can be used with a predictive model to determine a cache policy corresponding to a datastore. The cache policy can include output data to be provided via in the datastore and subsequently provided to a computing device in a just-in-time manner. The predictive model can be trained to output the cache policy based on input data received from a usage point, a provider point, or a datastore configuration.

20 Claims, 7 Drawing Sheets

JUST-IN-TIME DATA PROVISION BASED ON PREDICTED CACHE POLICIES

RELATED APPLICATIONS

This application is a continuation of U.S. patent application Ser. No. 16/238,259, filed on Jan. 2, 2019, entitled "Just-In-Time Data Provision Based On Predicted Cache Policies," which is hereby incorporated by reference in its entirety.

BACKGROUND

Datastores can include memory, caches, and/or databases which can be configured to receive, store, and provide data such that the data can be provided in a temporally relevant, or just-in-time manner. Cache policies can include executable instructions, which can be applied to the datastores to configure memory footprints, data access permissions, read/write permissions, and the temporal availability of the data present in the datastore. Cache policies can be predicted in a machine learning process based on usage patterns associated with applications or computing environments coupled to the datastores.

Machine learning can include an application of artificial intelligence that automates the development of an analytical model by using algorithms that iteratively learn patterns from data without explicit indication of the data patterns. Machine learning can commonly be used in pattern recognition, computer vision, email filtering and optical character recognition and can enable the construction of algorithms that can accurately learn from data to predict model outputs thereby making data-driven predictions or decisions.

SUMMARY

In one aspect, a method for predicting cache policies for use in just-in-time data provisioning is provided. In one embodiment the method can include receiving data provided as inputs to an application configured on a computing device including a data processor and coupled to a datastore. The data including a plurality of sequential inputs corresponding to a usage pattern of the application and provided in association with an objective to be performed via an oil and gas computing environment. The method can further include determining, using the data and a predictive model, a cache policy corresponding to the datastore and including output data to be provided via the data store. The predictive model can be trained to output the cache policy. The method can further include executing the cache policy at the datastore. The execution can cause the provision of the output data to the application from the datastore based on the data provided as inputs to the application. The method can further include providing an output via the application, the output including the output data, based on executing the cache policy. The method can further include performing at least a portion of the objective via computing device using the output.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including a connection over a network (e.g. the Internet, a wireless wide area network, a local area network, a wide area network, a wired network, or the like), via a direct connection between one or more of the multiple computing systems, etc.

DESCRIPTION OF DRAWINGS

These and other features will be more readily understood from the following detailed description taken in conjunction with the accompanying drawings, in which.

Figure 1:
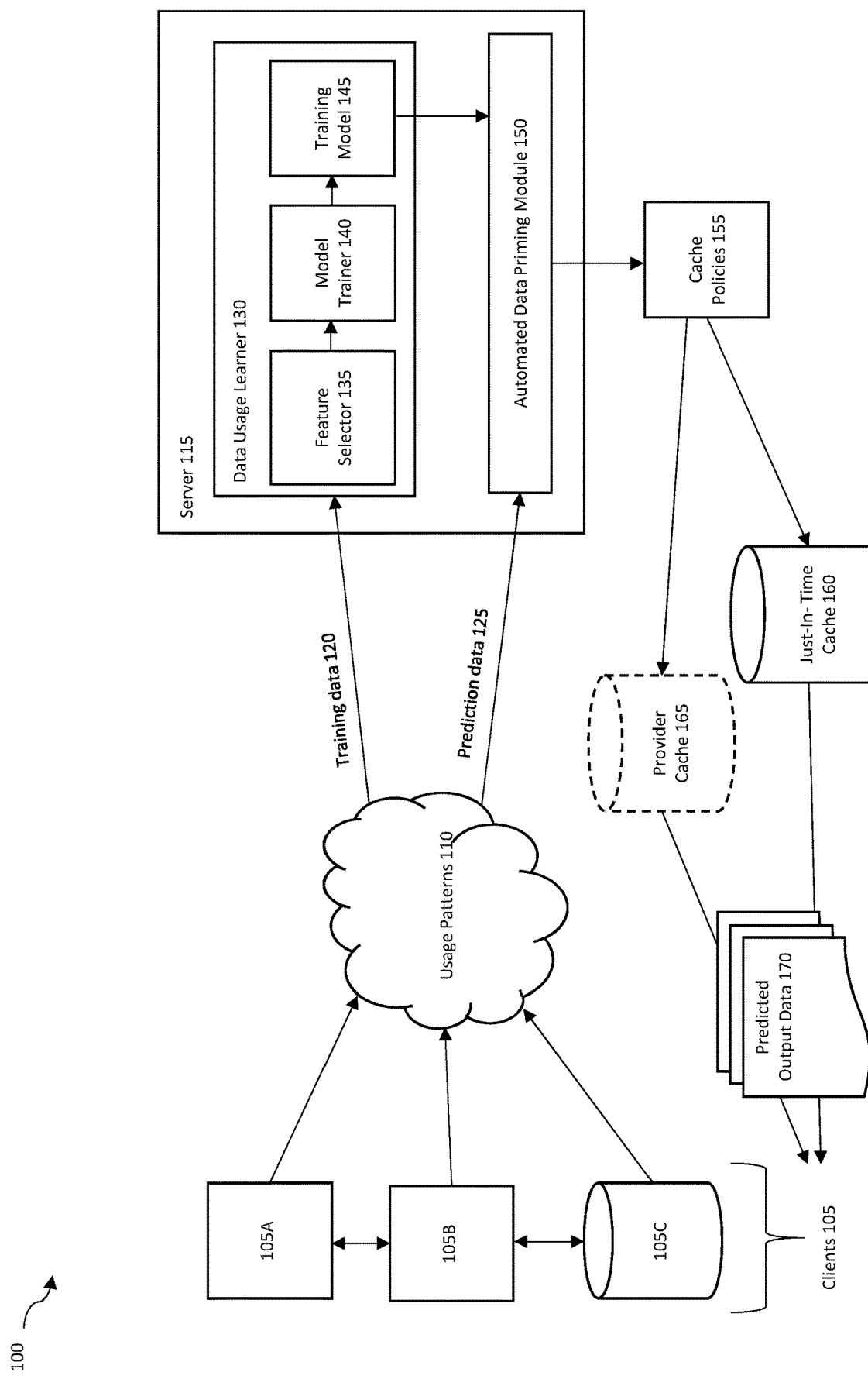
FIG. 1 illustrates an example architecture for a system configured to predict cache polices for use in Just-In-Time data provisioning.

It is noted that the drawings are not necessarily to scale. The drawings are intended to depict only typical aspects of the subject matter disclosed herein, and therefore should not be considered as limiting the scope of the disclosure.

DETAILED DESCRIPTION

Computing devices coupled to datastores in a computing environment, such as an oil and gas computing environment, can include applications with large data storage requirements in order to store and provide a wide range of data which may not be accessible locally on the computing device. The available storage capacity in the datastores coupled to the computing device can, over time, be reduced as a result of the volume of data that is required to persist in the datastore for a given applications usage. In an oil and gas computing environment, for example, applications used to monitor energy production assets, configure sensor deployments, and perform modeling and simulation of product asset models can require large amounts of data to be present in the datastores. Over time, as increased amounts of data are persisted in the datastore, the application's performance may worsen due to increased processing time required to access or store the data from or to the datastore. In some situations, for example, when the datastore is a remote datastore within the oil and gas computing environment or when the datastore is outside of the oil and gas computing environment, application performance can further worsen due to processing time necessary to perform transmission of data to or from the remotely located datastore.

To mitigate the degradation of application performance, more data than is needed can be stored in memory using traditional cache mechanisms. This approach can require larger configurations of memory resources resulting in increased operating costs associated with the datastore hardware. Cache mechanisms or policies can be configured to manage a variety of application memory requirements but often require consistent tuning or maintenance to achieve optimal application performance for data storage and/or retrieval. In addition, most cache policies are defined in advance for a pre-determined number of datastore or application configurations, which may or may not provide the best application performance based on a particular usage pattern of the application.

In general, systems, methods, and computer readable mediums are provided herein for predicting cache policies based on usage patterns collected from an application, an application back-end, as well as a data source, such as a datastore. The usage patterns can be provided to a server for processing to determine cache policies that, when applied to a particular datastore, provide only the data deemed necessary in regard to the collected usage pattern and provide the data only at the time it is deemed necessary. For example, based on a collected usage pattern corresponding to functions used in a well monitoring application configured within an oil and gas computing environment to assess current operating parameters of a particular cluster of wells, a predicted cache policy can be generated to provide or make historical operating parameter data associated with the particular cluster of wells available in the data store as users typically explore historical operating parameter data in relation to executing functionality associated with current operating parameter data. The server can include one or more predictive models that have been trained using a machine learning process. Based on receiving the collected usage patterns, the predictive model can generate a cache policy for managing the storage and retrieval of data most likely to be required as a result of the functionality executed via the observed usage pattern. The server can transmit the predicted cache policies to the datastore to be executed and can cause the datastore to provide the output data, as predicted output data, which corresponds to the data which is mostly likely to be required next based on the usage patterns. In this way, the systems, methods, and computer readable mediums described herein can alter the datastores and the computing devices coupled to the datastores to provide only the data which is most likely to be required based on usage patterns and the cache policies generated based on the usage patterns. Providing data in this just-in-time manner improves the functionality of the datastores and the computing devices coupled to the datastores with regard to the amount of required datastore memory, as well as in regard to maintaining cache policies for usage patterns which are not relevant to application usage and processing on the computing devices in the immediate moment in which the application and computing device are being used. In addition, applications and computing devices can store and receive data with a reduced latency as compared to systems which may not employ predicted cache policies. As a result, the improved datastores and computing devices can execute application functionality more efficiently due to the use of predicted cache policies which prime the datastore with the most relevant predicted output data to be provided at the time it is most needed by the application. In addition, based on determining the predicted cache policies using a machine learning process, the system can evaluate usage patterns over time and self-learn which cache policies are to be applied based on particular usage patterns, thereby reducing the need for manual configuration of cache policies and datastore configuration or memory management.

Determining an appropriate configuration of datastores can be an important consideration in a wide variety of computing environments. Datastores are often configured to broadly relate to the computing device and the applications to which they are coupled. In this way, the datastore can receive, store, and provide data associated with the application and/or the computing device on which the application is configured. Datastores can be configured with respect to size of available memory, read/write access or permissions, as well as the type and frequency of the data transmitted into and out of the datastore. In some circumstances, datastores can be over-designed to include features or configurations which may provide little benefit depending on how an application coupled to the datastore is being used by a user or by another computing device. For example, in an oil and gas computing environment, provisioning data associated with legacy pump systems on the same datastore as data associated with current condition monitoring applications may be inefficient depending on which applications or users are interacting with the datastore most frequently. Higher volumes of transmitted condition monitoring data can reduce the transmission times of legacy pump system data to and from the datastore and vice versa. As a result of reduced transmission times, application performance can also be reduced resulting incomplete data processing and/or undesirable user experiences. In contrast, creating smaller scale datastore deployments for the legacy pump system data and the current condition monitoring applications may also be inefficient from a maintenance perspective, as well as increased costs for additional datastore hardware.

Managing datastore configurations by gathering using usage patterns can be a more efficient manner to provision data in a computing environment which can include a variety of applications and computing devices. Usage patterns can include patterns of input provided to an application or web browser by a user or another computing device. Usage patterns can also include patterns of data that are received or provided by computing devices which act as provider points for the application such as servers and/or application back-ends which can be configured in cloud-based, virtual or containerized computing environments. Usage patterns can also include patterns of data that are received or provided to/from various data sources that are configured within the computing environment.

As a user interacts with an application in a computing environment, and subsequently various hierarchical layers or components of the computing environment, such as provider points and/or data sources, patterns of data usage can be collected and used as input to a trained prediction model configured to generate cache policies based on usage patterns. The cache policies can then be executed at the datastores to immediately provide only the data which is most associated with the usage pattern via the datastores.

An improved prediction system is provided herein including a system, methods, and computer-readable medium for predicting cache policies for use in just-in-time data provisioning from datastores. Although the improved prediction system described herein is provided in the context of an oil and gas computing environment, the improved system can be effective to predict cache policies for use in just-in-time data provisioning from datastores in a wide variety of computing environments outside of the oil and gas industry. Client computing devices configured as usage points to receive user inputs or data inputs provided by other computing devices can be coupled with functionality to collect usage patterns occurring in the user inputs. Similarly, servers, containers, or application back ends can be configured as provider points and can also be coupled with functionality to collect usage patterns occurring in the data transmitted through the provider points. The provider points communicate with data sources which can also be coupled with functionality to collect usage patterns occurring the data transmitted between the provider point and the data source. The usage patterns can form inputs to a prediction model that has been trained in a machine learning process to generate cache policies corresponding to particular usage patterns. The predicted cache policies can be applied to one or more datastores in the computing environment. Executing the cache policy at the datastore will cause the datastore to provision only the output data that is predicted to be required in the immediate future based on the most recently received usage patterns. The improved prediction system can therefore predict and generate cache policies based on usage patterns irrespective of datastore configurations which may be deployed throughout a computing environment. In this way, data corresponding to the usage patterns can be determined and made available at the datastore in a just-in-time manner which can result in reduced memory consumption, lower hardware costs, and improved application performance as a result of faster application execution. An additional benefit provided by the improved prediction system can include reduced maintenance and configuration burden for resources managing the deployment of datastores in the computing environment.

FIG. 1 is a diagram illustrating an example architecture 100 of a system configured to predict cache policies for use in Just-In-Time data provisioning based on collected usage patterns. The architecture 100 includes clients 105, usage patterns 110, and a server 115, which can be communicatively coupled to the clients 105 over a network.

As shown in FIG. 1, the architecture 100 includes clients 105, e.g., clients 105A-105C. The clients 105 can include a large or small-format computing devices or any other fully functional computing device, such as a desktop computers or laptop computers, mobile devices, tablets, smartphones, that can be configured to transmit usage patterns to server 115. Additionally, or alternatively, other devices configured in a computing environment, such as a servers, application back ends, cloud- or container-based processing entities can also be configured to transmit usage patterns to the server 115. Similarly, computing devices configured as data sources, such as servers or databases, can be configured to transmit usage patterns to server 115. For example, client 105A can include a laptop configured with a web-browser to display an application associated with monitoring a cluster of oil and gas refinery equipment. Client 105B can include a web server, hosted in a cloud-computing environment from which data is received and transmitted to the equipment monitoring application configured on the laptop (e.g., client 105A). Client 105C can include a database storing operating parameter data and condition monitoring rules associated with the cluster of oil and gas refinery equipment.

As further shown in FIG. 1, usage patterns 110 can be collected from the clients 105 and transmitted to the server 115. In some embodiments, the usage patterns can include training data 120 that is transmitted to the server 115 for use in a machine learning process. The training input 120 is used to train a machine learning algorithm in a machine learning process in order to generate a training model capable of predicting cache policies based on a wide variety of received usage patterns. In some embodiments, the usage patterns 110 includes prediction data 125 that is transmitted to the server 115 as inputs to the generated model that was trained in the machine learning process using the training data 120. Usage patterns can include patterns of data that are exchanged between the clients 105, for example, data of similar context or associated with a particular task, that is shared between an application (e.g., client 105A configured as the application associated with monitoring a cluster of oil and gas refinery equipment) and a back-end or server (e.g., client 105B configured as the web server associated with the equipment monitoring application). Similarly, a usage pattern can include patterns of data exchanged between client 105B and client 105C configured as a database storing operating parameter data and condition monitoring rules. Additional descriptions of the usage patterns 110 will be provided in relation to FIGS. 2A-2C.

As shown in FIG. 1, the architecture 100 includes a server 115 to receive the usage patterns 110 and generate cache policies 155. In broad overview, the server 115 functions in the training aspect of a machine learning process to receive usage patterns as training data 120 and generate a training model for use in predicting cache policies based on usage patterns. The server 115 includes a feature selector 135, which is used in the training aspect of the machine learning process to select subsets of features in the usage patterns 110. The server 115 also includes a model trainer 140 which uses a selected machine learning algorithm to process the selected subsets of features as inputs and generate a new training model 145 which can be subsequently deployed for use outside of the machine learning process to predict cache policies based on the usage patterns 110 which are received as prediction data 125.

As shown in FIG. 1, the prediction server 115 includes a feature selector 135. During the training aspect of the machine learning process, the feature selector 135 receives usage patterns and selects subsets of features in the usage patterns which are used as training input to train the selected machine learning algorithm. For each selected subset of features in the training input, the selected machine learning algorithm can be trained to predict cache policies associated with the subset of features for which the selected machine learning algorithm was trained. The trained machine learning algorithm can then be output as a new trained model (e.g., training model 145), which can then be subsequently applied to usage patterns (e.g., as prediction data input 125) to determine cache policies based on the usage patterns collected from the clients 105.

The prediction server 115 also includes a model trainer 140. In some embodiments, the model trainer 140 can be included in the server 115. In other embodiments, the model trainer 140 can be located remotely from the server 115. During the training aspect of the machine learning process, the model trainer 140 receives the training input including the selected subsets of features from the feature selector 135 and iteratively applies the subsets of features to the previously selected machine learning algorithm to assess the performance of the algorithm. As the machine learning algorithm processes the training input, the model trainer 140 learns patterns in the training input that map the machine learning algorithm variables to the target output data (e.g., the predicted cache policies) and generates a training model that captures these relationships. For example, as shown in FIG. 1, the model trainer 140 outputs the training model 145. As further shown in FIG. 1, the training model 145 that is output can be a trained automated data priming module 150.

As further shown in FIG. 1, the server 115 includes a trained automated data priming module 150. The trained automated data priming module 150 is a model or algorithm that has been generated as a result of the model training performed during the training aspect of the machine learning process. Once trained, the trained automated data priming module 150 can operate outside of a machine learning process to receive usage patterns as prediction data 125 and generate cache policies 155 for a given usage pattern. For example, the trained automated data priming module 150 outputs cache policies 155 that are optimized for client 105A based on the usage patterns associated with a user or computing device interacting with the web-application used to monitor the cluster of oil and gas refinery equipment.

As further shown in FIG. 1, the cache policies 155 can be transmitted to a datastore, such as a Just-In-Time cache 160 or a provider cache 165. The cache policies 155 can include executable instructions which when executed at a datastore, such as a Just-In-Time cache 160 or a provider cache 165, cause the datastore to generate the predicted output data 170. In some embodiments, the cache policies 155 include executable instructions which when executed cause the predicted output data 170 to be generated in a format associated with a usage point (e.g., client 105A) and/or a provider point (e.g., client 105B). Additional descriptions of the cache policies 155 will be provided in relation to FIGS. 2A-2C.

As further shown in FIG. 1, the architecture 100 includes a Just-In-Time cache 160. The Just-In-Time cache 160 can include a datastore, a hardware cache, a software cache, or a fast storage cache. The datastore or cache can include hardware or software components, including a data processor, which store data so that requests for the data can be served faster resulting in faster application execution times. In the improved system described herein, the Just-In-Time cache 160 can be primed with or include data to be provided as predicted output data 170 which corresponds to the previously provided usage patterns 110. The Just-In-Time cache 160 can provide or otherwise make available the predicted output data 170 at or near the immediate moment it is to be transmitted. The determination of what data to provide and when to provide it is included in the cache policy 155 that is executed at the datastores. Similarly, the architecture 100 can include a provider cache 165, as shown in FIG. 1. The provider cache 165 is a similarly structured datastore as the Just-In-Time cache 160, except that the provider cache 165 is specifically configured in association with one or more provider points (e.g., client 105B). The provider cache 165 can be configured to output data in a format that is specific to one or more provider points based on the cache policy 155 executed at provider cache.

As further shown in FIG. 1, based on applying the cache policies 155 to a datastore, such as the Just-In-Time cache 160 or the provider cache 165, the predicted output data 170 will be made available to the client from the datastores. The predicted output data 170 can include data which is most likely to be consumed or required based on the usage patterns 110. For example, based on usage patterns collected at client 105A in regard to monitoring a subset of the cluster of oil and gas refinery equipment, cache policies 155 can be predictively generated. The cache policies 155 can be applied to the Just-In-Time cache 160 to generate predicted output data 170 that is associated with historical alarm data for the subset of equipment that corresponds to the usage patterns 110 collected from the client 105A. In this way, the predicted output data 170 is determined by the cache policy 155 and is generated in real-time or near real-time to be provided or otherwise made available from a datastore, such as the Just-In-Time cache 160 or the provider cache 165. The predicted output data 170 is provided back to the clients 105.

Figure 2A:
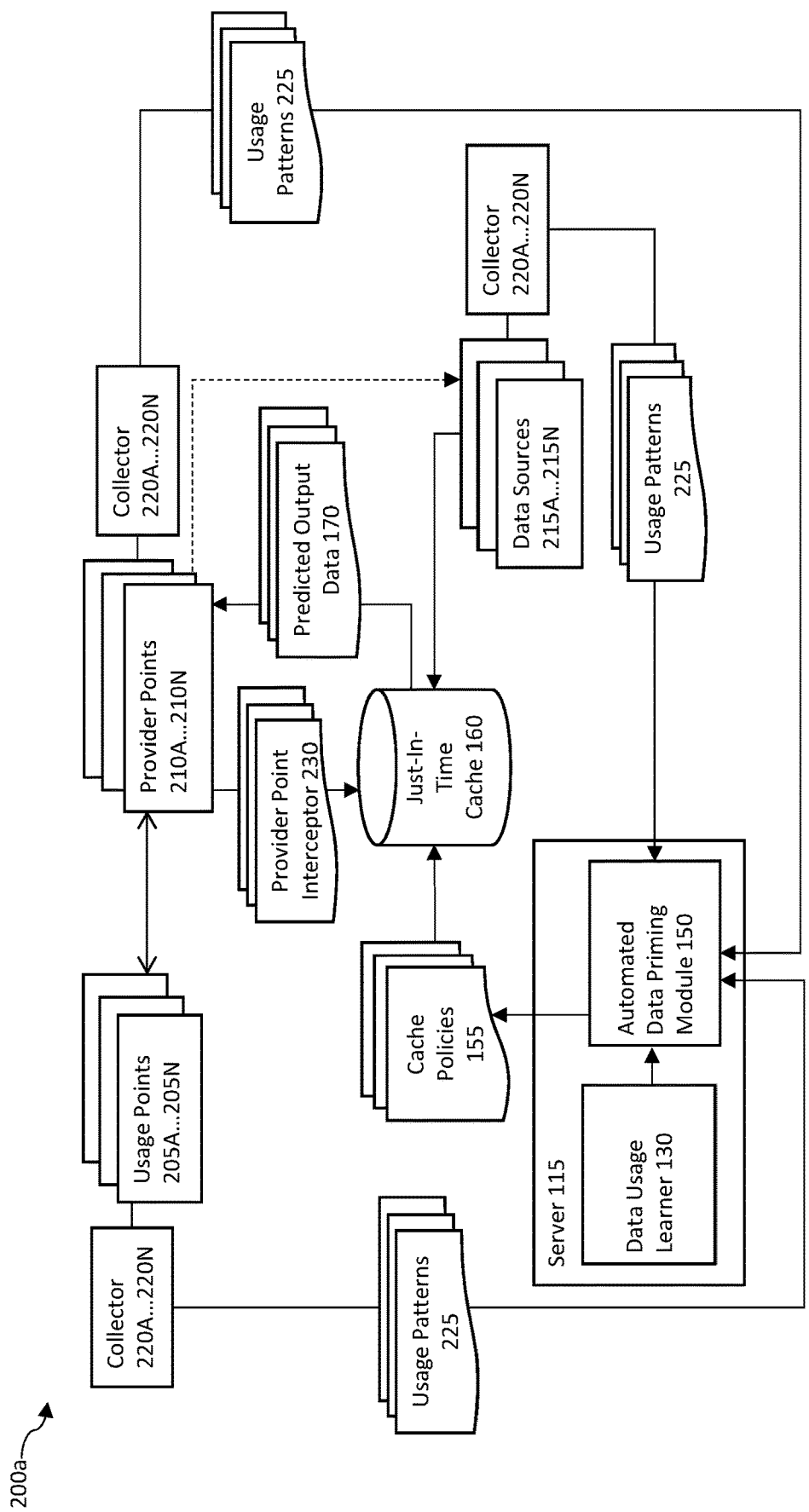
FIGS. 2A-2C illustrate example data flows of systems configured to predict cache polices for use in Just-In-Time data provisioning from different datastore configurations.
Figure 2B:
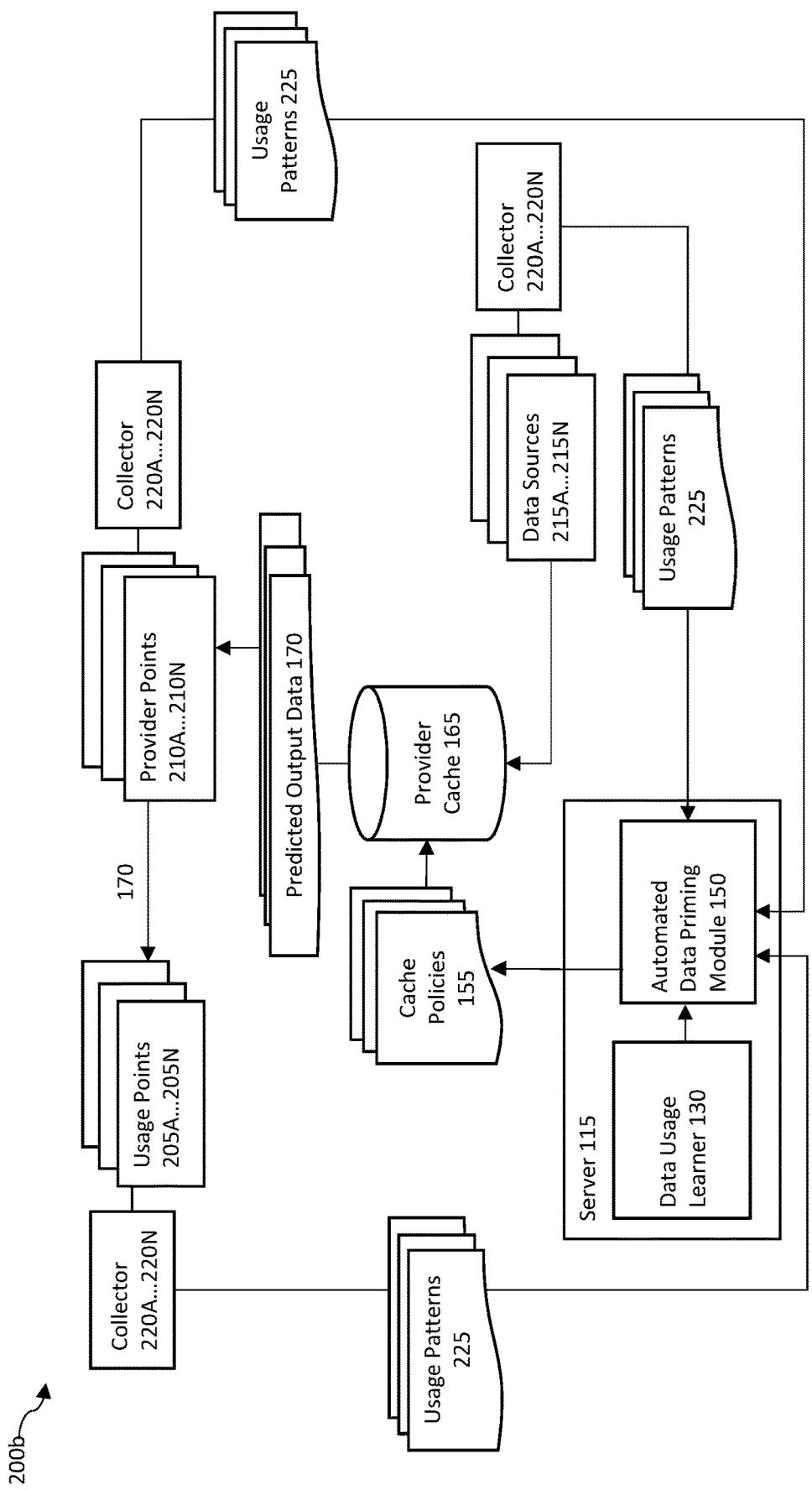
Figure 2C:
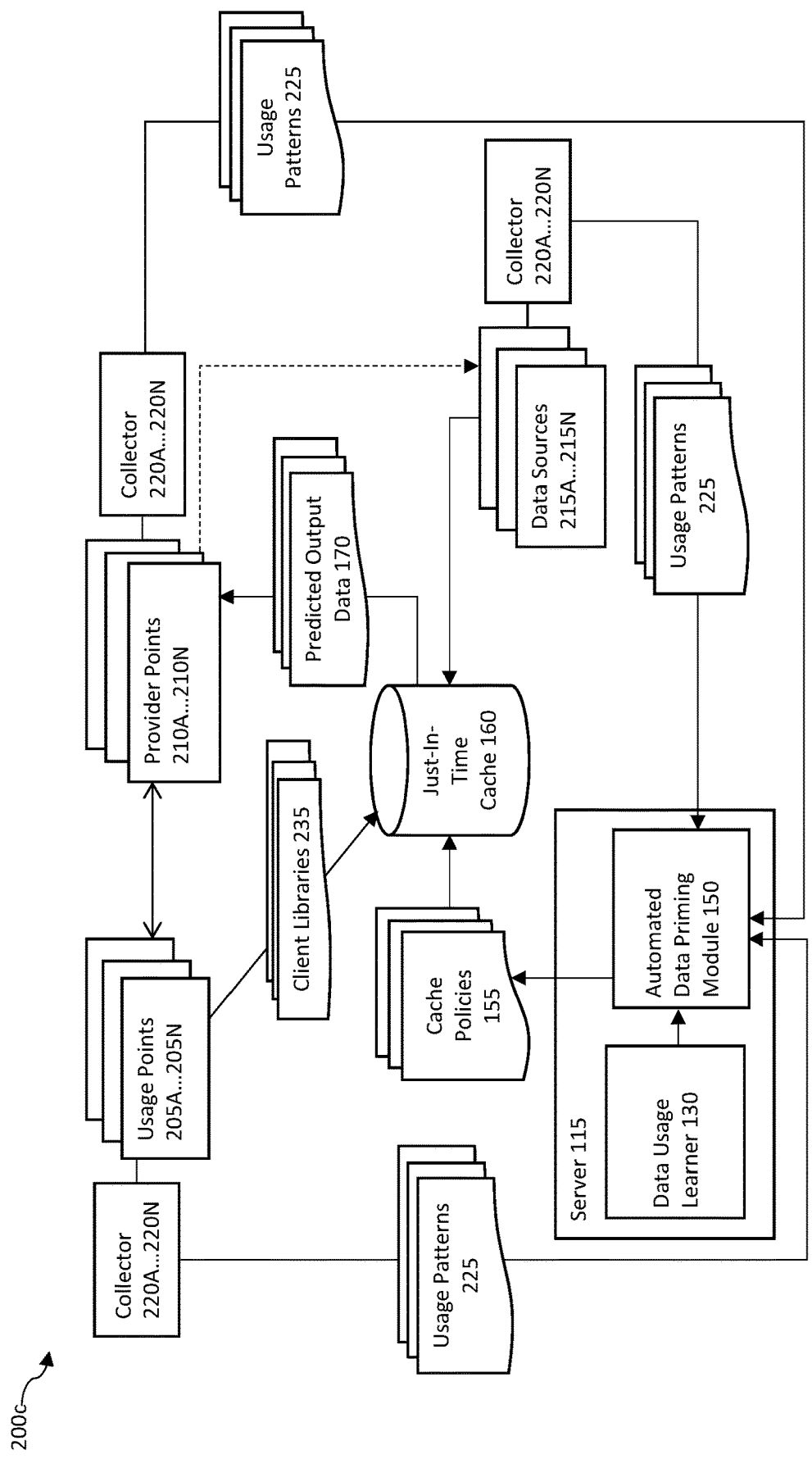

FIGS. 2A-2C illustrate example data flows of systems configured to predict cache polices for use in Just-In-Time data provisioning from different datastore configurations. Aspects of the different datastore configurations shown in FIGS. 2A-2C can be combined and are not limited to the configuration shown individually in FIGS. 2A-2C.

As shown in FIG. 2A, the system 200a includes a plurality of usage points 205A-205N, a plurality of provider points 210A-210N, and a plurality of data sources 215A-215N. The usage points 205 are similar to client 105A described in relation to FIG. 1 and can be configured as computing devices or computing entities where a user or other computing device interacts with an application, a service, or any computing process where data is provided to and received from a provider point, such as provider point 210 (e.g., client 105B). The provider points 210 are similar to the client 105B described in relation to FIG. 1, and can be configured as computing devices or computing entities where data is received from a usage point 205 and/or a data source 215. The provider points 210 can transmit data received from a datastore, such as the predicted output data 170, to the usage points 205. The system 200a also includes data sources 215, which can be similar to the data sources described in relation to client 105C of FIG. 1. The data sources 215 can include memory, databases, or any similar component configured with a data processor configured to receive, store and provide data.

As further shown in FIG. 2A, a collector 220 is coupled to each of the usage points 205, the provider points 210, and the data sources 215. A plurality of collectors 220A-220N can be configured and operatively coupled to the respective plurality of usage points 205A-205N, the respective plurality of provider points 210A-210N and to the respective plurality of data sources 215A-215N. The collectors 220 can be operatively coupled to the respective plurality of usage points 205A-205N, the respective plurality of provider points 210A-210N and to the respective plurality of data sources 215A-215N via a socket connection configured using TCP/IP protocols. The collector 220 can be configured as a listener to collect events, calls and other data requests or transmissions which can be included in usage patterns 225 collected from the usage points 205, the provider points 210, and/or the data sources 215 to which the collector 220 is coupled. In some embodiments, the collector 220 can collect usage data including data or metadata identifying the identity of a particular user or computing device, what data or metadata has been sent or received, when the data or metadata was sent or received, and where the data or metadata was sent to and where it was sent from. The collectors 220 can collect data and generate usage patterns 225 to be provided to the server 115.

As shown in FIG. 2A, the collectors 220 generate usage patterns 225 which are transmitted to the server 115 for use in predicting cache policies 155. The usage patterns 225 can include queries as well as patterns of data that are generated or received by the usage points 205, the provider points 210, and/or the data sources 215. In some embodiments, the usage patterns 225 can include data or metadata identifying the identity of a particular user or computing device, what data or metadata has been sent or received, when the data or metadata was sent or received, and where the data or metadata was sent to and where it was sent from. For example, the usage patterns 225 can include contextually or functionally related data that is associated with a particular task or objective to be performed in the computing environment which can include the usage points 205, the provider points 210, and/or the data sources 215. For example, the collector 220 can generate usage patterns 225 corresponding to condition monitoring data being requested or transmitted within the computing environment from a usage point 205 to a provider point 210 and further to a data source 215.

As shown in FIG. 2A, the usage patterns 225 are received by the automated data priming module 150 configured on the server 115. As shown in FIG. 2A, the server 115 is configured in a prediction mode and the usage patterns 225 are received by the automated data priming module 150. The server 115 can further operate in a training mode where the usage patterns 225 are received by the data usage learner 130, as described in relation to FIG. 1, and used to generate a trained automated data priming module 150. The automated data priming module 150 can include one or more predictive models that have been generated via the data usage learner 130 in a machine learning process and that have been trained to predict cache policies 155 based on usage patterns 225 that are received as prediction data. The cache policies 155 generated by the automated data priming module 150 can be transmitted to a datastore for execution.

As further shown in FIG. 2A, the system 200a includes a Just-In-Time cache 160. The Just-In-Time cache 160 can be a datastore configured to receive a cache policy 155 and execute the cache policy 155 causing the Just-In-Time cache 160 to generate predicted output data 170. The Just-In-Time cache 160 also receives data from the data sources 215 and can determine, based on the predicted cache policy 155 what subset of data from the data sources 215 corresponds to the cache policy 155. In this way, only the subset of data corresponding to the cache policy 155 (and the usage patterns 225 which were used to predict a particular cache policy) can be made available in the Just-In-Time cache 160.

As shown in FIG. 2A, the subset of data determined based on executing the cache policy 155 at the Just-In-Time cache 160 is output as predicted output data 170. The predicted output data 170 is provided to the provider points 210 via one or more provider point interceptors 230. The provider point interceptors 230 can include a hardware or software component, including a data processor, which can be configured with a set of methods or functions that direct data queries received at the provider points 210 to the Just-In-Time cache 160 instead of to a data source, such as the data sources 215. In this way, faster retrieval of query results can be provided via the Just-In-Time caches 160 instead of via the data sources 215. If the query result data is not available in the Just-In-Time cache 160, the queries will be sent to the data sources 215 directly as shown in dashed lines.

FIG. 2B illustrates a system 200b which can be configured as an alternate or different configuration from the system 200a described in relation to FIG. 2A. The system 200b includes similar components performing similar functionality to those described in relation to system 200a of FIG. 2A, except that in FIG. 2B, the system 200b includes a provider cache 165 in place of the Just-In-Time cache 160 described in relation to system 200a of FIG. 2A.

As shown in FIG. 2B, usage patterns 225 are received by the automated data priming module 150 and used to predict cache policies 155 to be executed at a datastore, such as the provider cache 165. The provider cache 165 can include a datastore that is specifically configured in association with the provider points 210. In this way, predicted output data 170 can be directly provided to the provider points 210.

FIG. 2C illustrates a system 200c which can be configured as an alternate or different configuration from the systems 200a and 200b described in relation to FIGS. 2A and 2B. The system 200c includes similar components performing similar functionality to those described in relation to systems 200a and 200b of FIGS. 2A and 2B, except that in FIG. 2C, the system 200c includes a provider cache 165 in place of the Just-In-Time cache 160 described in relation to system 200a of FIG. 2A.

As shown in FIG. 2C, usage patterns 225 are received by the automated data priming module 150 and used to predict cache policies 155 to be executed at a datastore, such as the Just-In-Time cache 160. As shown in FIG. 2C, the subset of data determined based on executing the cache policy 155 at the Just-In-Time cache 160 is output as predicted output data 170. The predicted output data 170 is provided to the provider points 210. In some embodiments, the system 200c can include one or more client libraries 235. The client libraries 235 include similar functionality as the provider point interceptors 230 described in relation to FIG. 2B. However, the client libraries 235 can include methods and functions that are specifically associated with particular usage pointes 205. For example, the client libraries 235 can include functionality enabling web browsers and mobile application clients implemented on a variety of client operating systems to submit queries directly to the Just-In-Time cache 160. If the query result data is not available in the Just-In-Time cache 160, the queries will be sent to the data sources 215 directly as shown in dashed lines. In some embodiments, the client libraries 235 can provide a "read ahead" capability to overcome network-induced latencies when clients 105 are known to be configured with enough available storage capacity or memory to receive the predicted output data 170.

Figure 3A:
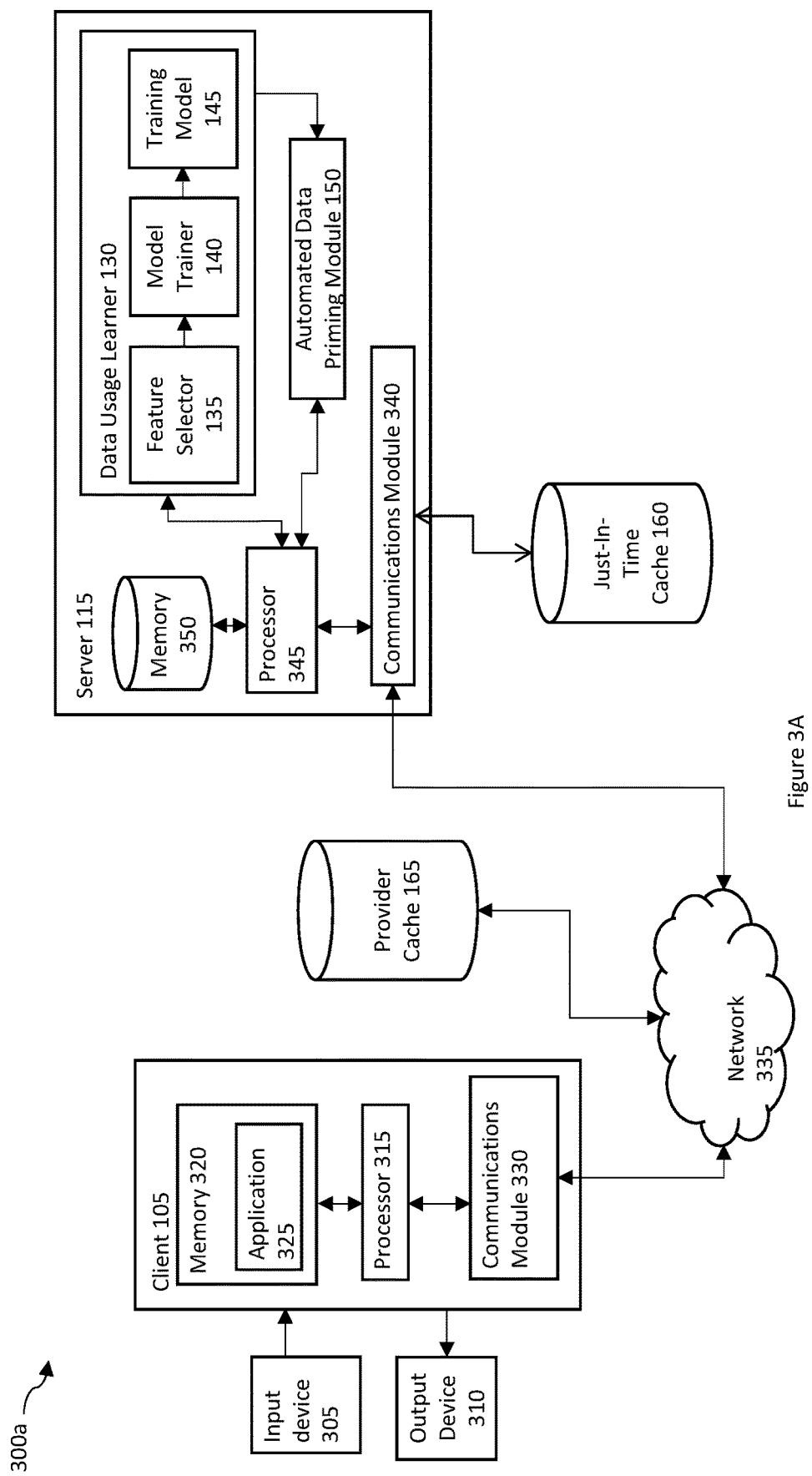
FIGS. 3A-3B illustrate example block diagrams of systems configured to predict cache polices for use in Just-In-Time data provisioning.

FIG. 3A is an example block diagram of a system 300a for predicting cache polices for use in Just-In-Time data provisioning using machine learning according to some embodiments. System 300a includes an input device 305 and an output device 310 coupled to a client 105, such as the client 105 described in relation to FIG. 1. The client 105 includes a processor 315 and a memory 320 storing an application 325. The client 105 also includes a communications module 330 connected to network 335. System 300a also includes a server 115, such as server 115 described in relation to FIG. 1. The server 115 includes a communications module 340, a processor 345 and a memory 350. The server 115 also includes a data usage learner 130, such as the data usage learner 130 described in relation to FIG. 1. The data usage learner 130 includes a feature selector 135 a model trainer 140 and one or more training models 145. The data usage learner 130 includes similar components and performs similar operations as the server 115 shown in FIG. 1, except where indicated otherwise in the foregoing description. The server 115 also includes one or more automated data priming modules 150, shown in dotted lines to indicate that the automated data priming modules 150, that were output during the training performed in the machine learning process, can include one or more trained automated data priming modules, such as the one or more trained automated data priming modules 150.

As shown in FIG. 3A, the system 300a includes an input device 305. The input device 305 receives user input and provides the user input to client 105. The input device 305 can include a keyboard, mouse, microphone, stylus, game controller, joy stick, hand/or any other device or mechanism used to input user data or commands to an application or user interface on a client, such as client 105. In some embodiments, the input device 305 can include haptic, tactile or voice recognition interfaces to receive the user input, such as on a small-format device. In some embodiments, the input device 305 can be an input device associated with a modeling and simulation environment, an oil and gas computing environment, a virtual reality environment or an augmented reality environment.

The system 300a also includes a client 105. The client 105 communicates via the network 335 with the server 115. The client 105 receives input from the input device 305. The client 105 can be, for example, a large-format computing device, such as large-format computing device 105A as described in relation to FIG. 1, a small-format computing device (e.g., a smartphone or tablet), or any other similar device having appropriate processor, memory, and communications capabilities to transmit and receive data associated with an oil and gas computing environment. The client 105 can be configured to receive, transmit, and store data that can be associated with usage patterns and used to predict cache policies 155 for use in determining predicted output data 170 to be provided to the client 105.

As further shown in FIG. 3A, the client 105 includes a processor 315 and a memory 320. The processor 315 operates to execute computer-readable instructions and/or data stored in memory 320 and transmit the computer-readable instructions and/or data via the communications module 330. The memory 320 can store computer-readable instructions and/or data associated with the user provided inputs which can form a portion of the usage patterns 110. The memory 320 can further store the predicted output data 170 that is received by the client 105 based on executing the cache policies 155 at a datastore, such as the Just-In-Time cache 160 or the provider cache 165. The memory 320 includes an application 325. The application 325 can be, for example, an application to receive user input for use in monitoring the conditions of a cluster of oil and gas refinery equipment. The application 325 can generate data associated with a task to be performed in an oil and gas computing environment and transmit the data to a provider point 210 for execution of the task. The generated data can include usage patterns 110 that can be received by a server, such as server 115 for use in predicting cache policies 155. In some embodiments, the application 325 can include textual, graphical, or touch-based user interfaces to receive user input forming the usage patterns 110.

As shown in FIG. 3A, the client 105 includes a communications module 330. The communications module 330 transmits the computer-readable instructions and/or user data stored on or received by the client 105 via network 335. The network 335 connects the client 105 to the server 115. The network 335 can include, for example, any one or more of a personal area network (PAN), a local area network (LAN), a campus area network (CAN), a metropolitan area network (MAN), a wide area network (WAN), a broadband network (BBN), the Internet, and the like. Further, the network 335 can include, but is not limited to, any one or more of the following network topologies, including a bus network, a star network, a ring network, a mesh network, a star-bus network, tree or hierarchical network, and the like.

As further shown in FIG. 3A, the server 115 operates to receive, store and process the usage patterns 110 associated with data that is generated and received by client 105. The server 115 can be any device having an appropriate processor, memory, and communications capability for hosting a machine learning process. In certain aspects, one or more of the servers 115 can be located on-premises with client 105, or the server 115 can be located remotely from client 105, for example in a cloud computing facility or remote data center. The server 115 includes a communications module 340 to receive the computer-readable instructions and/or user data transmitted via network 335. The server 115 also includes one or more processors 345 configured to execute instructions that when executed cause the processors to predict cache policies 155 based on usage patterns 110. The server 115 also includes a memory 350 configured to store the computer-readable instructions and/or user data associated with predicting cache policies 155. For example, memory 350 can store one or more training models, such as models that may be used by the model trainer 140 during the training phase of a machine learning process to generate a training model 145. In some embodiments, memory 350 can store one or more of the training models, such as the training model 145 that were generated during the training phase of a machine learning process and were trained to output predicted cache policies 155 for different usage points, provider points, and/or different configurations of datastores such as the configurations described in relation to FIGS. 2A-2C. In some embodiments, the memory 350 can store usage patterns 110 that are received from the collectors 220 coupled to each client 105. In these embodiments, the stored usage patterns 110 can be used as a training dataset in the machine learning process in order to train a prediction model, such as the training model 145. In some embodiments, the memory 350 can store one or more trained automated data priming modules 150 that are used to predict cache policies 155 based on the usage patterns collected from clients 105.

As shown in FIG. 3A, the server 115 includes a data usage learner 130. The data usage learner 130 functions in the training phase or mode of a machine learning process to receive usage patterns 110 as training input and processes the usage pattern data to train one or more training models. The data usage learning 130 includes a feature selector 135, a model trainer 140, and one or more training models 145. In some embodiments, the training models 145 that are generated and output as a result of the machine learning process are configured on server 115 as standalone components on server 115. For example, the automated data priming modules 150 are configured on server 115, as shown in FIG. 3A, to process usage patterns 110 and output predicted output data 170. In some embodiments, the trained automated data priming modules 150 are stored in memory 350 on server 115.

The data usage learner 130 is configured to implement a machine learning process that receives usage pattern data as training input and generates a training model that can be subsequently used to predict cache policies to be executed at a datastore in order to provide predicted output data in a just-in-time manner. The components of the machine learning process operate to receive usage pattern data as training input, select unique subsets of features within the usage pattern data, use a machine learning algorithm to train a model based on the subset of features in the training input and generate a training model that can be output and used for future predictions based on a variety of received usage pattern data or datastore configurations.

As shown in FIG. 3A, the data usage learner 130 includes a feature selector 135. The feature selector 135 operates in the machine learning process to receive usage pattern data and select a subset of features from the usage pattern data which will be provided as training inputs to a machine learning algorithm. In some embodiments, the feature selector 135 can select a subset of features corresponding to different types of clients 105 and/or different types of usage pattern data included in the received usage pattern data such that the machine learning algorithm will be trained to predict cache policies 155 based on the selected subset of features.

During the machine learning process, the feature selector 135 provides the selected subset of features to the model trainer 140 as inputs to a machine learning algorithm to generate one or more training models. A wide variety of machine learning algorithms can be selected for use including algorithms such as support vector regression, ordinary least squares regression (OLSR), linear regression, logistic regression, stepwise regression, multivariate adaptive regression splines (MARS), locally estimated scatterplot smoothing (LOESS), ordinal regression, Poisson regression, fast forest quantile regression, Bayesian linear regression, neural network regression, decision forest regression, boosted decision tree regression, artificial neural networks (ANN), Bayesian statistics, case-based reasoning, Gaussian process regression, inductive logic programming, learning automata, learning vector quantization, informal fuzzy networks, conditional random fields, genetic algorithms (GA), Information Theory, support vector machine (SVM), Averaged One-Dependence Estimators (AODE), Group method of data handling (GMDH), instance-based learning, lazy learning, and Maximum Information Spanning Trees (MIST).

The model trainer 140 evaluates the machine learning algorithm's prediction performance based on patterns in the received subset of features processed as training inputs and generates one or more new training models 145. The generated training models, e.g., trained prediction models 145, are then capable of receiving usage pattern data and generating predicted cache policies based on the usage pattern data.

As further shown in FIG. 3A, the trained automated data priming modules 150 that were generated as a result of performing the machine learning process, can receive usage pattern data and process the usage pattern data to output predicted cache policies 155 that are optimized based on the type of client 105 (e.g., a usage point 205A or a provider point 210B) as well as the configuration of the particular datastore (e.g., a Just-In-Time cache or a provider cache 165). For example, the trained automated data priming modules 150, that were produced in the machine learning process, can be subsequently be included in an artificial intelligence system or an application configured to receive usage pattern data as prediction inputs and process the data to output predicted cache policies 155 in regard to a specific task or computing objective being performed at a usage point and are optimized in regard to a system configuration including a Just-In-Time cache 160. In some embodiments, the processor 345 can store the predicted cache policies 155 that were output from the trained automated data priming module 150 in memory 350. In other embodiments, the outputted cache policies 155 can be forwarded to communications module 340 for direct transmission to the Just-In-Time cache 160 or to the provider cache 165 via network 335. Once the cache policies 155 are executed at the particular datastore, the predicted output data 170 can be transmitted to the client 105 where the predicted output data can be further transmitted to an output device 310, such as a monitor, printer, portable hard drive or other storage device.

Figure 3B:
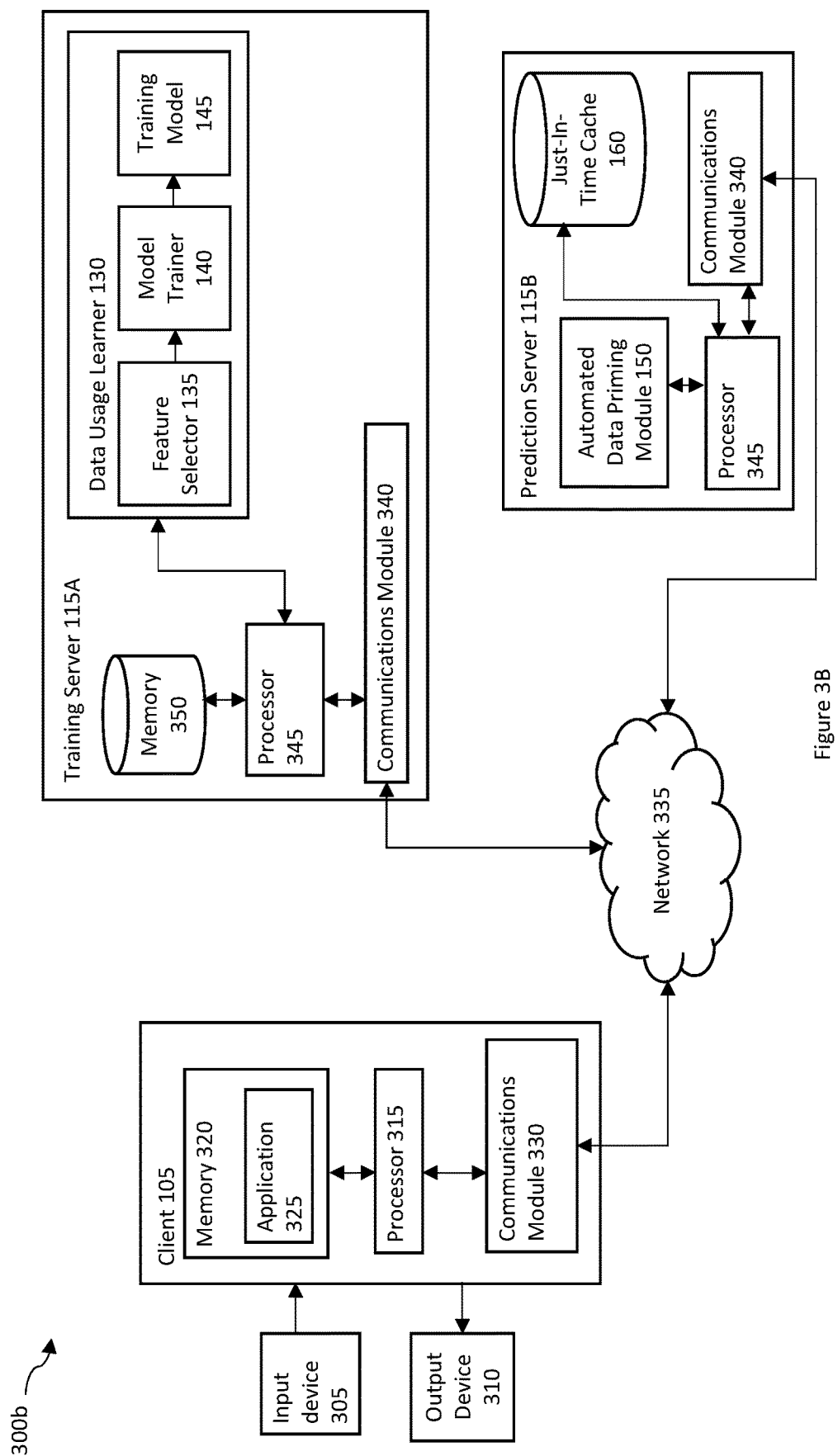

FIG. 3B illustrates an example block diagram of a system 300b using a machine learning process configured on a training server 115A. The individual components and functionality of each component shown and described in relation to training server 115A in FIG. 3B are identical to the components and respective functionality shown and described in relation to server 115 of FIG. 3A with the exception that the training server 115A shown in FIG. 3B does not include one or more trained automated data priming modules 150 as shown in FIG. 3A.

Instead, as shown in FIG. 3B, the system 300b includes a training server 115A that is separate from a prediction server 115B. The prediction server 115B includes components and functionality similar to the server 115 shown in FIG. 3A with the exception that the prediction server 115B shown in FIG. 3B does not include a training sub-system, such as the data usage learner 130 shown in FIG. 3A. The prediction server 115B shown in FIG. 3B includes one or more trained automated data priming modules 150.

The trained automated data priming modules 150 configured on the prediction server 115B are models or algorithms, such as training models 145, which were generated from a machine learning process and have been trained in the machine learning process to output predicted cache policies based on usage pattern data. For example, upon receiving usage pattern data from a client, for example client 105A, the trained automated data priming module 150 can be employed to generate one or more cache policies 155 that are optimized based on the received usage pattern data and/or the datastore configuration associated with system in which the prediction server is in use. In some embodiments, each of the trained automated data priming modules 150 can generate a cache policy 155 for a specific usage point, provider point, data source, and/or datastore configuration. In some embodiments, each of the trained automated data priming modules 150 can generate a cache policy 155 based on a specific attributes or metadata identified within the received usage pattern data.

As shown in FIG. 3B, system 300b also includes a training server 115A. The training server 115A includes a data usage learner 130 which implements a machine learning process and includes a feature selector 135, a model trainer 140, and one or more training models 145. In some embodiments, the training server 115A can be located in the same location as prediction server 115B. In other embodiments, the training server 115A can be located in a remote location, for example in a second data center that is separately located from the data center or client location where the prediction server 115B is located. In some embodiments, the data usage learner 130, configured on the training server 115A, can be utilized to evaluate different machine learning algorithms and generate one or more alternate training models 145. For example, based on using different subsets of features in the received usage pattern data as the training inputs to a different machine learning algorithm and process, the data usage learner 130 can train and output a different training model 145 than the trained automated data priming module 150 configured on the prediction server 115B which can have been trained using a separate machine learning algorithm and process.

The data usage learner 130 can also be configured with a machine learning process to train and output one or more training models 145 that are capable of generating sequences of actions based on historical usage pattern data. In some embodiments, the data usage learner 130 can generate a model, such as trained prediction model 145 which can be capable of generating a cache policy when one or more of the usage pattern data features which are traditionally used to determine a particular cache policy for the particular usage pattern are not available. For example, a cache policy can be generated based on usage pattern data received from a usage point that is operatively coupled to a particular provider point. If the collector coupled to the usage point is unable to output or measure the usage pattern from the usage point, a model can be generated to output a cache policy based on the usage pattern data that was collected from the provider point that is associated with the particular usage point.

The data usage learner 130 can also be configured with a machine learning process to train and output multiple models that have been trained in the machine learning process based on non-overlapping or partially overlapping sets of features. In some embodiments, the multiple models different sets of features can be implemented on the prediction server 115B to create a more robust system that includes an ensemble or collection of models. In such embodiments, the prediction server 115B can more accurately predict cache policies based on usage patterns for different users, tasks or objectives, usage points, provider points, data sources, datastore configurations or other statistically correlated patterns observed in the received usage pattern data in situations when certain usage pattern data features used in a given model can be missing or incomplete.

Figure 4:
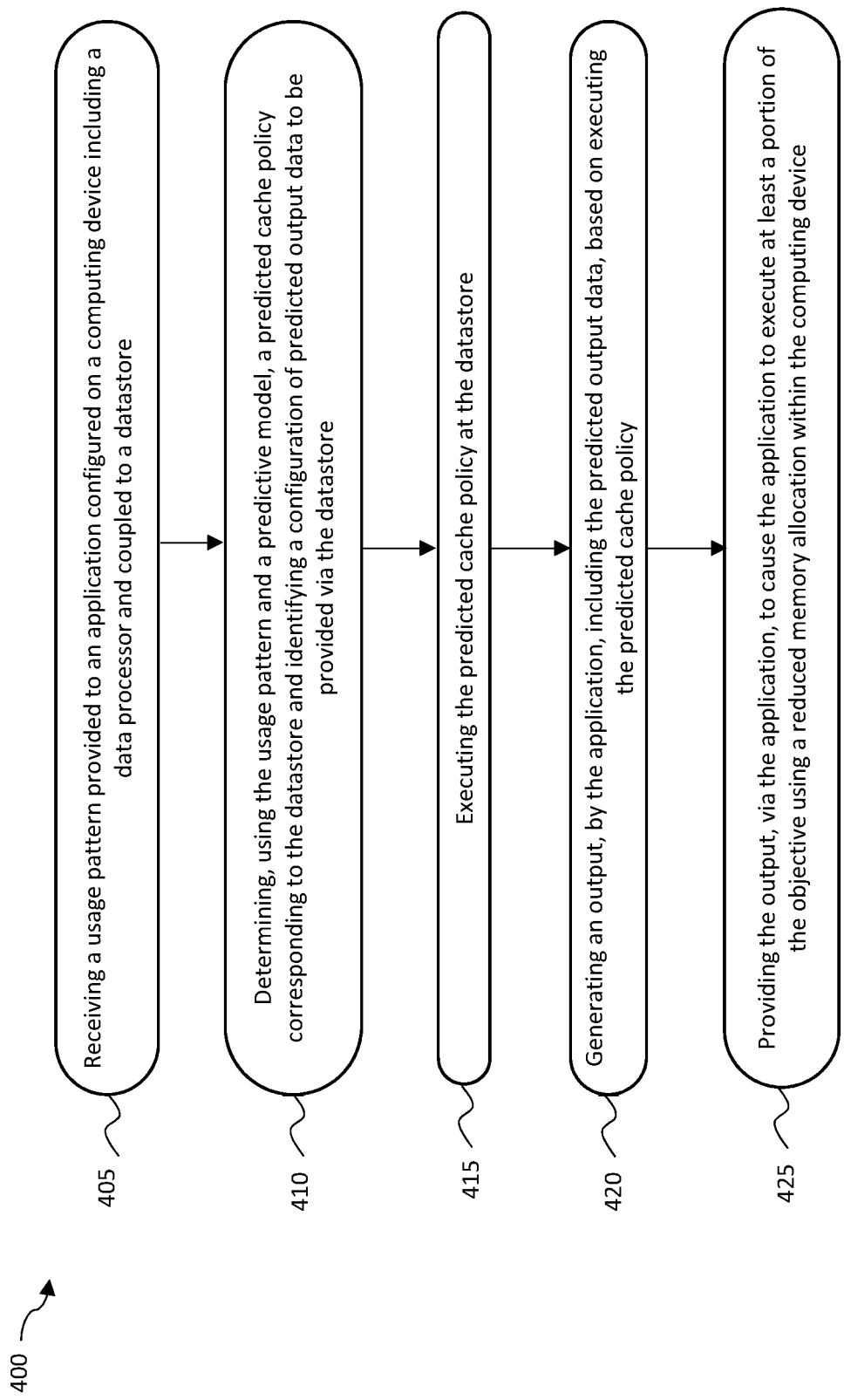
FIG. 4 is a flowchart illustrating one exemplary embodiment of a method for predicting cache polices for use in Just-In-Time data provisioning.

FIG. 4 is a flow diagram illustrating an exemplary embodiment of a process 400 for predicting cache policies based on usage pattern data using the client/server of the system 300a and 300b as shown and described in relation to FIGS. 3A and 3B, respectively. In certain aspects, embodiments of the process 400 can include greater or fewer operations than illustrated in FIG. 4 and the operations can be performed in a different order than illustrated in FIG. 4.

In operation 405, the server 115 receives a usage pattern provided to an application configured on a computing device including a data processor and coupled to a datastore. The usage pattern can include a plurality of sequential inputs that are provided to the application in association with an objective or task to be performed using an oil and gas computing environment. The oil and gas computing environment can be configured with a plurality of computing devices, each including a data processor, to receive inputs and generate outputs associated with operational, diagnostic, analytical, and/or search objectives corresponding to a plurality of deployed assets used in oil and gas production and refinement operations. For example, and as previously described in relation to FIG. 1, the computing devices can include a usage point, a provider point, a data source, and/or a data store. The datastore can be associated with an application provider, for example as a provider cache 160. In some embodiments, the datastore can be associated with a third-party. The usage pattern data can include data that is generated in response to monitoring data generated by the oil and gas computing environment.

In operation 410, the server 115 determines using the usage pattern and a predictive model, a predicted cache policy corresponding to the datastore and identifying a configuration of predicted output data to be provided via the datastore. The predicted cache policy can include an expiration parameter identifying a duration of time for the predicted output data to persist in the datastore prior to removal from the datastore. In some embodiments and based on the expiration parameter, output data can be removed from the datastore at the end of the duration of time identified in the expiration parameter or based on receiving a second, different usage pattern.

The predictive model can be trained to output the predicted cache policy based on a machine learning process. The machine learning process can be configured to generate the predictive model based on usage patterns which can correspond to data collected from a usage point within the oil and gas computing environment, a provider point within the oil and gas computing environment, or a data source within the oil and gas computing environment. In some embodiments, the machine learning process can be configured to generate new version of the predicted model based on a configurable usage pattern collection schedule where each new version can include one or more new or updated predicted cache policies. In some embodiments the configurable usage pattern collection schedule includes collecting data ever hour, day, week, month, or during a user-defined time-period.

In operation 415, the datastore 160 or 165 executes the predicted cache policy. Upon receiving the predicted cache policy transmitted by the server 115, the datastore, for example the Just-In-Time cache 160 or the provider cache 165 executes the predicted cache policy 155 causing the datastore to provide the predicted output data to the client 105 in response to the usage pattern data that was originally received by the server 115. Executing the cache policy 155 at the datastore causes the datastore to determine the configuration of predicted output data that is to be provided to the client 105. In some embodiments, executing the cache policy can cause the datastore to receive the necessary predicted output data from the data sources. In this way, the predicted output data 170 can be received by the datastore and provided to the client 105 in a just-in-time manner thereby increasing the processing performance of the client while requiring memory within the client.

In operation 420, the client 105 generates an output including the predicted output data. The output can be generated based on executing the predicted cache policy. The output is associated with the next most likely data to be requested or required by the client based on the inputs forming the usage pattern data for which the cache policy was generated.

In operation 425, the client 105 provides the output to cause the application to execute at least a portion of the objective using a reduced memory allocation within the computing device. As a result of priming the datastores with the predicted output data by executing the cache policy, the client 105 can execute the objective being performed by the user or another computing device using a reduced memory configuration or allocation than if the datastores where not present and primed with the predicted output data.

Exemplary technical effects of the methods, systems, and computer-readable medium described herein include, by way of non-limiting example, determining and generating a cache policy to prime a datastore with predicted output data such that the clients 105 can process data more efficiently by requiring less memory to be configured on the client 105. Additionally, by providing the predicted output data to the datastore in a just-in-time manner based on the predicted cache policy, the datastore can require a smaller memory footprint and can more efficiently transmit data to the client to mitigate data transmission latencies that may be introduced by networks or datastores containing larger volumes of data which must be search to determine the output data. In these ways, the client device 105 can be improved to execute functionality that is associated with the predicted output data more reliably and thereby improve the functionality of the computer with respect to the objective the client device 105 is configured to perform.

Certain exemplary embodiments have been described to provide an overall understanding of the principles of the structure, function, manufacture, and use of the systems, devices, and methods disclosed herein. One or more examples of these embodiments have been illustrated in the accompanying drawings. Those skilled in the art will understand that the systems, devices, and methods specifically described herein and illustrated in the accompanying drawings are non-limiting exemplary embodiments and that the scope of the present invention is defined solely by the claims. The features illustrated or described in connection with one exemplary embodiment can be combined with the features of other embodiments. Such modifications and variations are intended to be included within the scope of the present invention. Further, in the present disclosure, like-named components of the embodiments generally have similar features, and thus within a particular embodiment each feature of each like-named component is not necessarily fully elaborated upon.

The subject matter described herein can be implemented in analog electronic circuitry, digital electronic circuitry, and/or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processor of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, (e.g., EPROM, EEPROM, and flash memory devices); magnetic disks, (e.g., internal hard disks or removable disks); magneto-optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The techniques described herein can be implemented using one or more modules. As used herein, the term "module" refers to computing software, firmware, hardware, and/or various combinations thereof. At a minimum, however, modules are not to be interpreted as software that is not implemented on hardware, firmware, or recorded on a non-transitory processor readable recordable storage medium (i.e., modules are not software per se). Indeed "module" is to be interpreted to always include at least some physical, non-transitory hardware such as a part of a processor or computer. Two different modules can share the same physical hardware (e.g., two different modules can use the same processor and network interface). The modules described herein can be combined, integrated, separated, and/or duplicated to support various applications. Also, a function described herein as being performed at a particular module can be performed at one or more other modules and/or by one or more other devices instead of or in addition to the function performed at the particular module. Further, the modules can be implemented across multiple devices and/or other components local or remote to one another. Additionally, the modules can be moved from one device and added to another device, and/or can be included in both devices.

The subject matter described herein can be implemented in a computing system that includes a back-end component (e.g., a data server), a middleware component (e.g., an application server), or a front-end component (e.g., a client computer having a graphical user interface or a web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

Approximating language, as used herein throughout the specification and claims, can be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language can correspond to the precision of an instrument for measuring the value. Here and throughout the specification and claims, range limitations can be combined and/or interchanged, such ranges are identified and include all the sub-ranges contained therein unless context or language indicates otherwise.

One skilled in the art will appreciate further features and advantages of the invention based on the above-described embodiments. Accordingly, the present application is not to be limited by what has been particularly shown and described, except as indicated by the appended claims. All publications and references cited herein are expressly incorporated by reference in their entirety.

The invention claimed is:

1. A method comprising:
   receiving by a server including a first datastore, data characterizing a pattern of sequential inputs provided to an application monitoring a cluster of oil and gas refinery equipment, the application configured on a computing device including a data processor, the computing device coupled to the server, the data wherein the pattern of sequential inputs corresponds to a usage pattern of the application and is provided with respect to an objective to be performed using the application in an oil and gas computing environment coupled to the cluster of oil and gas refinery equipment;
   determining, using the pattern of sequential inputs and a predictive model, a cache policy corresponding to the first datastore and including output data to be provided via the datastore, the cache policy predicted via the predictive model, wherein the predictive model is trained in a machine learning process to output the cache policy;
   executing the cache policy at the first datastore, the execution causing the first datastore to provide the output data to the application based on the pattern of sequential inputs provided to the application;
   providing, by the application, an output including the output data, wherein the output is provided based on executing the cache policy; and
   executing, by the application, at least a portion of the objective using the output.

2. The method of claim 1, wherein the objective includes at least one of an operational objective associated with operating the cluster of oil and gas refinery equipment coupled to the oil and gas computing environment, a diagnostic objective diagnosing the oil and gas refinery equipment coupled to the oil and gas computing environment, analytical objective analyzing the oil and gas refinery equipment coupled to the oil and gas computing environment, or a search objective associated with searching for information related to the oil and gas refinery equipment coupled to the oil and gas computing environment.

3. The method of claim 1, wherein the computing device includes one of a usage point, a provider point, a second datastore, and a data source.

4. The method of claim 3, wherein the first datastore or the second datastore is associated with an application provider or a third party.

5. The method of claim 1, wherein the cache policy includes an expiration parameter specifying an expiration period for the output data to be available in the first datastore.

6. The method of claim 5, further comprising removing the output data from the first datastore at an end of the expiration period or based on receiving data characterizing a second pattern of sequential inputs provided to the application.

7. The method of claim 1, wherein the output data is formatted based on the first datastore, the application, or a named user of the application.

8. The method of claim 1, wherein the predictive model is trained in the machine learning process configured to generate the predictive model based on the pattern of sequential inputs collected from a usage point within the oil and gas computing environment, a provider point within the oil and gas computing environment, or a data source within the oil and gas computing environment.

9. The method of claim 8, wherein the machine learning process is configured to generate a plurality of predictive models based on a predetermined schedule, wherein each predictive model of the plurality of predictive models includes at least one new or updated cache policy.

10. The method of claim 9, wherein the pre-determined schedule specifies collecting the data characterizing the pattern of sequential inputs provided to the application continuously, every hour, every day, every week, every month, or during a user-defined time-period.

11. A system comprising:
    at least one computing device including an application monitoring a cluster of oil and gas refinery equipment, the application configured on the at least one computing device;
    a server coupled to the at least one computing device via a network, the server including a processor and a memory storing computer-readable instructions, a plurality of prediction models, and a first datastore, the processor configured to execute the computer-readable instructions, which when executed, cause the processor to perform operations comprising:
       receiving data characterizing a pattern of sequential inputs provided to the application configured on the computing device and coupled to a datastore, the pattern of sequential inputs corresponding to a usage pattern of the application and provided with respect to an objective to be performed using the application in an oil and gas computing environment coupled to the cluster of oil and gas refinery equipment;
       determining, using the pattern of sequential inputs and a predictive model, a cache policy corresponding to the first datastore and including output data to be provided via the datastore, the cache policy predicted via the predictive model, wherein the predictive model is trained in a machine learning process to output the cache policy;
       executing the cache policy at the first datastore, the execution causing the first datastore to provide the output data to the application based on the pattern of sequential inputs provided to the application;
       providing, by the application, an output including the output data, based on executing the cache policy; and
       executing, by the application, at least a portion of the objective using the output.

12. The system of claim 11, wherein the objective includes at least one of an operational objective associated with operating the cluster of oil and gas refinery equipment coupled to the oil and gas computing environment, a diagnostic objective associated with diagnosing the oil and gas refinery equipment coupled to the oil and gas computing environment, an analytical objective associated with analyzing the oil and gas refinery equipment coupled to the oil and gas computing environment, or a search objective associated searching for information related to the oil and gas refinery equipment coupled to the oil and gas computing environment.

13. The system of claim 12, wherein the computing device includes one of a usage point, a provider point, a second datastore, and a data source.

14. The system of claim 13, wherein the first datastore or the second datastore is associated with an application provider or a third party.

15. The system of claim 11, wherein the cache policy includes an expiration parameter specifying an expiration period for the output data to be available in the first datastore.

16. The system of claim 15, further comprising removing the output data from the first datastore at an end of the expiration period or based on receiving data provided characterizing a second pattern of sequential inputs provided to the application.

17. The system of claim 11, wherein the output data is formatted based on the first datastore, the application, or a specific named user of the application.

18. The system of claim 11, wherein the predictive model is trained in the machine learning process configured to generate the predictive model based on the pattern of sequential inputs collected from a usage point within the oil and gas computing environment, a provider point within the oil and gas computing environment, or a data source within the oil and gas computing environment.

19. The system of claim 18, wherein the machine learning process is configured to generate a plurality of predictive models based on a predetermined schedule, wherein each predictive model of the plurality of predictive models includes at least one new or updated cache policy.

20. The system of claim 19, wherein the pre-determined schedule specifies collecting the data characterizing the pattern of sequential inputs provided to the application continuously, every hour, every day, every week, every month, or during a user-defined time-period.

* * * * *